Jan. 4, 1938. J. P. JOLLIFFE 2,104,042
AUTOMATIC CONTROL MECHANISM FOR FISH LOCK DRAINAGE
Filed May 25, 1937
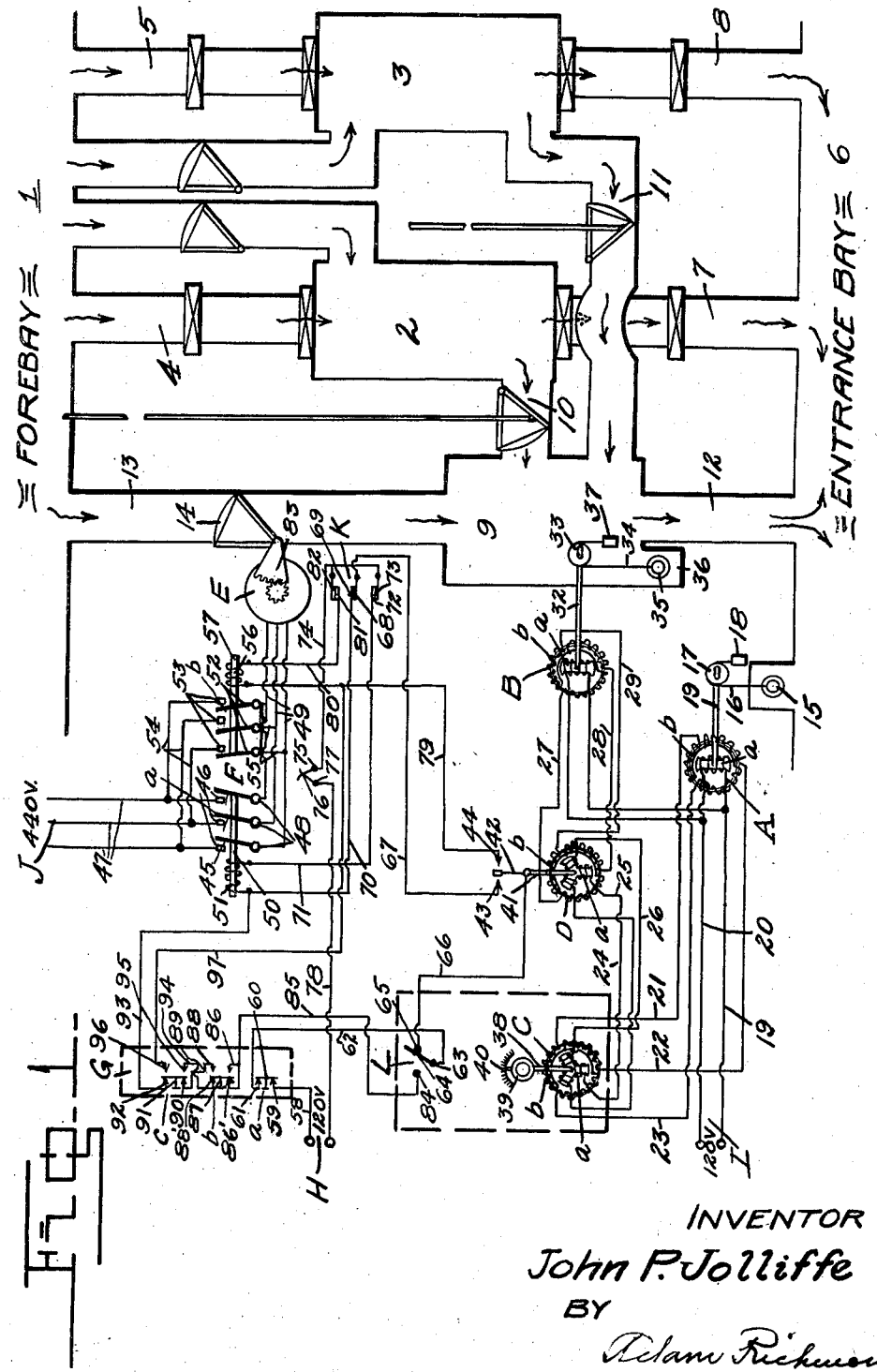
INVENTOR
John P. Jolliffe
BY
Adam Richmond
ATTORNEY Patented Jan. 4, 1938

2,104,042

UNITED STATES PATENT OFFICE 2,104,042

AUTOMATIC CONTROL MECHANISM FOR FISH LOCK DRAINAGE

John P. Jolliffe, Portland, Oreg., assignor to the Government of the United States of America, represented by the Secretary of War Application May 25, 1937, Serial No. 144,619

10 Claims. (Cl. 61—21)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an automatic valve control to be used in conjunction with the Water supply and drainage system for fish locks, disclosed in the application of Ben L. Peterson, No. 144,612 filed May 25, 1937. More especially this invention is directed to an electro-mechanical valve control for automatically regulating the water adapted to flow from a chamber located in a dam construction into an entrance bay situated adjacent the downstream face of the dam.

In the application referred to a pair of fish locks located in a dam construction are in gate-controlled communication at their upper ends with a forebay and at their lower ends with a tailrace. These locks are filled with water through suitably arranged valve controlled conduits communicating with the forebay and are emptied through suitably arranged valve controlled conduits discharging into a common discharge chamber, which is in communication with an entrance bay and likewise with the forebay through a valve controlled conduit. By this arrangement auxiliary water from the forebay discharging into the common discharge chamber augments the discharge waters from the two locks to provide a regulated flow for the entrance bay.

Heretofore, the valve located in the conduit establishing communication between the forebay and the common discharge chamber has been manually operated, but this arrangement has not proved entirely satisfactory and it is the aim and purpose of this invention to provide a float controlled electro-mechanical installation in connection with the tainter valve controlling communication between the forebay and the discharge chamber, which will automatically regulate the position of the tainter valve in accordance with a predetermined head differential between the water in the discharge chamber and that in the lower end of the entrance bay.

One object of this invention is to provide a float controlled electro-mechanical mechanism having facilities to maintain a predetermined head differential between the water level in the discharge chamber of the dam construction and that of the entrance bay and to automatically adjust the tainter valve controlling communication between the forebay and the discharge chamber when the selected head differential has been varied by a change of water level, in the entrance bay or discharge chamber.

Another object of this invention is to provide a float controlled electro-mechanical mechanism wherein a deviation from the selected head differential will alter the phase relation of a series of polyphase units to operate the principal valve controlling communication between the forebay and the discharge chamber.

With these and other objects in view this invention consists in certain novel details of construction, combination and arrangement of parts to be more particularly hereinafter described and claimed.

Referring more particularly to the accompanying drawing in which corresponding parts are indicated by similar reference characters:

Fig. 1 is a diagrammatic view showng the forebay and entrance bay of a dam construction, fish locks in the dam construction, communicating with the forebay and the entrance bay, a common discharge chamber, in valve controlled communication with the forebay and the fish locks and in open communication with the entrance bay, and showing the electro-mechanical float controlled mechanism in operative association with a tainter valve located in the conduit between the forebay and the discharge chamber.

In the illustrated embodiment characterizing this invention: (1) indicates the forebay of a dam construction, (2) and (3) fish locks, the upper ends of the locks communicating with the forebay via the gate-controlled fish passages (4) and (5), the lower ends with an entrance bay (6) through gate-controlled fish passages (7) and (8). A discharge chamber common to the locks (2) and (3) receives the discharged water from the locks through the valve controlled conduits (10) and (11). The common discharge chamber (9) is in open communication with the lower end of entrance bay (6), via the conduit (12). Chamber (9) is also in communication with forebay (1) through conduit (13) controlled by an automatically operated tainter valve (14), so that as the valve (14) is opened and closed water may be delivered directly from the forebay into the chamber (9) and discharged with the water from the locks into the entrance bay (6).

In order to automatically maintain a predetermined head differential between the level of the water in discharge chamber (9) and that in entrance bay (6), a tainter valve (14) is connected with a float controlled electro-mechanical mechanism comprising a float controlled self-synchronizing transmitter A, operated by variation of water level in the entrance bay (6), a self-synchronous transmitter B, float controlled and operated by variation of water level in the discharge chamber (9), a differential self-synchronous selector C, a differential self-synchronous contact making receiver D, controlled by the transmitters, a motor E in operative connection with tainter valve (14), a solenoid controlled reversing mechanism F for changing the connections of motor E, a push button panel G, permitting manual control of the tainter valve (14), and suitable power supplies, H, I, and J.

To enable transmitter A to be controlled by variations in the level of the water in entrance bay (6), there is provided a float (15) adapted to be located in a suitable well formed in the entrance bay (6). Float (15) is suspended from the lower end of a pulley rod (16) which passes over pulley (17) and is connected to a counterweight (18). Pulley (17) is connected to the free end of a shaft (19) the opposite end of which is operatively connected with the rotor winding $a$ of transmitter A for a purpose hereinafter to appear.

As the polyphase electrical assembly characterized by transmitters A and B, selector C and receiver D are adapted to operate in accordance with a phase relation determined by selector C, said transmitters, selector and receiver are electrically connected as follows: rotor winding $a$ of transmitter A is connected via conductors (19) and (20) to a 120 volt power supply I, and its three-phase stator windings $b$ are connected via conductors (21), (22) and (23) to the three-phase stator windings $b$ of selector C.

Y-rotor windings $a$ of selector C are connected via conductors (24), (25) and (26) to Y-rotor windings $a$ of receiver D and the three-phase stator windings of receiver D are connected via conductors (27), (28) and (29) to the three-phase stator windings $b$ of transmitter B. Rotor windings $a$ of transmitter B are operatively associated with a shaft (32) provided at its outer end with a pulley (33) over which there is adapted to pass a pulley rope (34), having affixed to one end a float (35) located in well (36) of discharge chamber (9). The opposite end of pulley rope (34) is provided with a suitable counterweight (37).

The rotor windings $a$ of selector C are adapted to be manually set by means of arm (38), having a pointer (39) at its outer end adapted to coact with a scale (40) which is calibrated in terms of head differentials between the discharge chamber (9) and the entrance bay (6), so that the selector C may be adjusted for any selected differential. The rotor windings $a$ of receiver D are adapted to control the movement of a contact-making arm (41) equipped at its free end with a contact (42), adapted to oscillate between two stationary contacts (43) and (44). The movable contact (42) of receiver D and the two stationary contacts (43) and (44) control the circuits of mechanism F, controlling the direction of operation of motor E.

This reversing mechanism F comprises solenoid controlled reversing switches $a$ and $b$. Reversing switch $a$ of mechanism F includes a trio of movable switch blades (45) adapted to contact with a similar number of stationary contacts (46) which are connected to a 440 volt power supply J via the three conductors (47). Movable contacts (45) of reversing switch $a$ are connected to contacts (48) and through these contacts to motor E via the three conductors (49). Switch blades (45) are simultaneously actuated by means of a solenoid plunger (50), controlled by solenoid (51). It will thus be seen that when the solenoid (51) has been energized and its plunger retracted the trio of movable switch blades (45) will be engaged with stationary contacts (46) to complete the circuit between the 440 volt power supply J and motor E.

To reverse the operating direction of motor E mechanism F is provided with another reversing switch $b$ which includes a trio of movable switch blades (52) which are adapted to coact with the stationary contacts (53) which latter are connected to the 440 volt supply J, via the three conductors (54). Movable switch blades (52) are connected to motor E via the conductors (55) and (49).

Switch blades (52) of reversing switch $b$ are adapted to be simultaneously operated by solenoid plunger (56) which is suitably associated with solenoid (57) so that energization of the solenoid (57) will retract the plunger and position switch blades (52) in engagement with stationary contacts (53).

To enable receiver D to control the reversing switch $a$ of mechanism F, the circuit from the 120 volt source to solenoid (51) of reversing switch $a$ is as follows: 120 volt power supply H, conductor (58), stationary contact (59), of push button $a$, on manual control panel G, movable contact (60) of said push button $a$, stationary contact (61), conductor (62), terminal (63), movable contact (64), stationary contact (65), conductor (66), movable contact (42) of selector D, stationary contact (43), conductor (67), contact (68) of switch K, contact (69), of said switch, conductor (70), solenoid (51) of reversing switch $a$; through said solenoid to conductor (71), contact (72) of switch K, contact (73) of said switch, conductor (74), terminal (75), switch blades (76), terminal (77) and conductor (78) to the 120 volt power supply H.

Solenoid (56) of reversing switch $b$ is connected to the 120 volt supply H via conductor (58), stationary contact (59), of push button $a$, movable contact (60), and stationary contact (61) of said push button $a$, conductor (62), terminal (63), switch blade (64), contact (65), conductor (66), movable contact (42) of selector D, stationary contact (44), conductor (79), solenoid (56) of reversing switch $b$, conductor (80), contact (81) of switch K, contact (82) of said switch, conductor (74), terminal (75), switch blades (76), terminal (77) and conductor (78) of 120 volt power supply H.

In view of the preceding circuits it will be seen that when the movable arm (41) of selector D has been actuated to place contact (42) in engagement with stationary contact (43), solenoid (51), of reversing mechanism F will be energized to complete the circuit of motor E and as the latter is operatively connected with tainter valve (14) through mechanism (83), said tainter valve (14) will be operated to regulate valve flow conditions between the discharge chamber and the entrance bay.

On the other hand when the movable contact (42) of receiver D is in engagement with stationary contact (44) solenoid (56) of reversing switch $a$ of mechanism F will be energized to operate the switch blades controlled by its plunger, so as to change the connections to motor E, and reverse its direction of operation, as will be understood without further discussion.

As it may be desirable on some occasions to manually control the tainter gate (14), push buttons $b$ and $c$ are provided in connection with the push button panel G, so that operation of push button *b* will connect the solenoid (51) of reversing mechanism F, with the 120 volt supply H, provided the switch blade (64) has been brought into engagement with stationary contact (84) of automatic control switch L, said connection being through conductor (58), stationary contact (59), movable contact (60) of push button *a*, stationary contact (61), conductor (62), terminal (63), switch blade (64), stationary contact (84), conductor (85), stationary contact (86), movable contact (87), of push button *b*, stationary contact (88), conductor (89), stationary contact (90), of push button *c*, conductor (93) to solenoid (51), and from solenoid (51) via conductor (71), contact (72) of switch K, contact (73), conductor (74), terminal (75), switch blade (76), terminal (77), conductor (78) to the 120 volt power supply H. The solenoid (56) is placed in circuit with the 120 volt power supply H, via conductor (58), stationary contact (59) of push button *a*, movable contact (60), and stationary contact (61) of said push button *a*, conductor (62), terminal (63), stationary contact (84), conductor (85), stationary contact (86'), movable contact (87) of push button *b*, and stationary contact (88'), conductor (94), stationary contact (95), movable contact (91) of push button *c*, stationary contact (96), conductor (97), solenoid (56), conductor (80), contact (81) of switch K, contact (82) of switch K, conductor (74), terminal (75), switch blade (76), terminal (77), conductor (78) to the 120 volt power supply H.

It will thus be seen that operation of push button *c* on panel G will energize the solenoid (56) and reverse the operating direction of the current through motor E.

Having described the electrical and mechanical features of this invention it will be apparent that when selector C has been positioned to provide the requisite head differential between the discharge chamber (9), and entrance bay (6), should a change of water elevation occur either in the discharge chamber (9) or entrance bay (6), float (35) or float (15) will be operated to rotate the rotor winding of either transmitter A or transmitter B, to cause receiver D to operate and place its movable contact (42) in engagement with either stationary contact (43) or (44) to close the circuit through solenoids (51) or (56), and thus operate tainter valve (14).

Having described my invention, what I claim as new and wish to secure by Letters Patent is:

1. In a mechanism of the character described, the combination with a dam construction having a forebay and an entrance bay and including a discharge chamber in conduit communication with the forebay and the entrance bay; of a valve arranged in the conduit between the forebay and the discharge chamber, means to provide a regulated water flow between said forebay and discharge chamber, means in connection with said valve to effect its operation and means associated with the discharge chamber and entrance bay and co-acting with the first mentioned means to maintain a predetermined head differential between the discharge chamber and the entrance bay.

2. In a mechanism of the character described, the combination with a dam construction having a forebay and an entrance bay and including a discharge chamber in conduit communication with the forebay and entrance bay; of a valve in the conduit between the forebay and the discharge chamber to regulate the water flow conditions therebetween, operating means for said valve, float controlled means in connection with the discharge chamber and the entrance bay, said means cooperating with the valve-operated means to adjust the latter so as to maintain a predetermined head differential between the discharge chamber and the entrance bay.

3. In a mechanism of the character described, the combination with a dam construction having a forebay and an entrance bay and including a discharge chamber in conduit communication with the forebay and entrance bay; of a valve arranged in the conduit between the forebay and discharge chamber, a motor connected with said valve, an operating circuit for said motor and means in connection with the discharge chamber and entrance bay and coacting with the circuit of the motor to effect operation of the valve in accordance with a predetermined head differential between the discharge chamber and the entrance bay.

4. In a mechanism of the character described, the combination with a dam construction having a forebay and an entrance bay and including a discharge chamber in conduit communication with the forebay and entrance bay; of a valve arranged in the conduit between the forebay and discharge chamber, a motor connected with said valve to effect its operation so as to regulate water flow conditions between the forebay and the discharge chamber, an operating circuit for said motor and a float controlled means in connection with the discharge chamber and entrance bay and coacting with the circuit of the motor to effect operation of the valve in accordance with a predetermined head differential between the discharge chamber and the entrance bay.

5. In a mechanism of the character described, the combination with a dam construction having a forebay and an entrance bay and including a discharge chamber in conduit communication with the forebay and entrance bay of a valve arranged in the conduit between the forebay and the discharge chamber, a motor adapted to operate said valve to regulate water flow conditions between the forebay and the discharge chamber, a circuit for said motor, an electro-mechanical means associated with the discharge chamber and entrance bay and cooperating with the motor circuit to open and close said circuit in accordance with the change in the elevation of water in the discharge chamber and entrance bay, whereby to maintain a predetermined head differential between said discharge chamber and entrance bay.

6. In a mechanism of the character described, the combination with a dam construction having a forebay and an entrance bay and including a discharge chamber in conduit communication with the forebay and entrance bay; of a valve arranged in the conduit between the forebay and the discharge chamber, a motor adapted to operate said valve to regulate water flow conditions between the forebay and the discharge chamber, a circuit for said motor, a float controlled electro-mechanical means associated with the discharge chamber and entrance bay and cooperating with the motor circuit to open and close said circuit in accordance with the change in the elevation of water in the discharge chamber and entrance bay, whereby to maintain a predetermined head differential between said discharge chamber and entrance bay.

7. In a mechanism of the character described, the combination with a dam construction having a forebay and an entrance bay and including a discharge chamber in conduit communication with the forebay and entrance bay; of a valve arranged in the conduit between the forebay and the discharge chamber and operable to regulate water flow conditions therebetween, motor driven means to actuate said valve, a circuit for said motor, a float in the discharge chamber, a second float in the entrance bay, electro-mechanical means controlled by the movement of said floats to open and close the motor circuit in accordance with the change in elevation of the water levels in the discharge chamber and entrance bay, whereby to regulate said valve so as to maintain a predetermined head differential between the discharge chamber and the entrance bay.

8. In a mechanism of the character described, the combination with a dam construction having a forebay and an entrance bay and including a discharge chamber in conduit communication with the forebay and entrance bay; of a valve arranged in the conduit between the forebay and the entrance bay to regulate water flow conditions therebetween, a motor to operate said valve, a circuit for said motor, a switch adapted to open and close said circuit, an electro-mechanical means responsive to variations in the water levels of the discharge chamber and entrance bay, and co-acting with said switch whereby to adjust said valve in the conduit between the forebay and the discharge chamber to provide a predetermined head differential between the discharge chamber and the entrance bay.

9. In a mechanism of the character described, the combination with a dam construction having a forebay and an entrance bay and including a discharge chamber in conduit communication with the forebay and entrance bay to regulate water flow conditions therebetween, a motor to operate said valve, a circuit for said motor, a switch adapted to open and close said circuit, a float responsive electro-mechanical means in connection with the discharge chamber and the entrance bay and co-acting with said switch, whereby to adjust said valve in the conduit between the forebay and the discharge chamber to provide a predetermined head differential between the discharge chamber and the entrance bay, said means including a selector to determine the head differential to be maintained between the discharge chamber and the entrance bay.

10. In a mechanism of the character described, the combination with a dam construction having a forebay and an entrance bay and including a discharge chamber in conduit communication with the forebay and entrance bay of a valve arranged in the conduit between the forebay and the entrance bay to regulate water flow conditions therebetween, a motor to operate said valve, a circuit for said motor, a switch adapted to open and close said circuit, a float controlled electro-mechanical means in connection with the discharge chamber and the entrance bay and co-acting with said switch, whereby to adjust said valve in the conduit between the forebay and the discharge chamber to provide a predetermined head differential between the discharge chamber and the entrance bay, said means including a selector to determine the head differential to be maintained between the discharge chamber and the entrance bay and a pair of float controlled transmitters co-acting with said selector.

JOHN P. JOLLIFFE.